United States Patent [19]

van Ackeren et al.

[11] 4,061,544
[45] Dec. 6, 1977

[54] APPARATUS FOR PROVIDING WASTE GAS RECIRCULATION IN COKE OVEN BATTERIES

[75] Inventors: Joseph van Ackeren, Allison Park; Edward J. Helm, Pittsburgh, both of Pa.

[73] Assignee: Koppers Company, Inc., Pittsburgh, Pa.

[21] Appl. No.: 682,562

[22] Filed: May 3, 1976

[51] Int. Cl.² .................... C10B 5/02; C10B 5/12; C10B 43/12
[52] U.S. Cl. ........................... 202/141; 201/2; 202/151; 202/241
[58] Field of Search ............ 201/2; 202/241, 141, 202/151

[56] References Cited

U.S. PATENT DOCUMENTS

| 1,633,911 | 6/1927 | Van Ackeren | 202/141 |
| 3,047,474 | 7/1962 | Tucker | 202/151 X |
| 3,123,540 | 3/1964 | Van Ackeren | 202/141 |
| 3,192,134 | 6/1965 | Bonnett | 202/241 |
| 3,222,260 | 12/1965 | Becker | 202/141 X |
| 3,261,763 | 7/1966 | Tucker | 202/141 |
| 3,345,051 | 10/1967 | Van Ackeren | 202/141 X |
| 3,373,087 | 3/1968 | Van Ackeren | 202/141 X |
| 3,472,907 | 10/1969 | Coberly | 202/241 X |
| 3,833,478 | 9/1974 | Tucker | 202/151 |
| 3,963,582 | 6/1976 | Helm et al. | 201/2 |

FOREIGN PATENT DOCUMENTS

| 392,708 | 5/1933 | United Kingdom | 202/151 |
| 605,632 | 7/1948 | United Kingdom | 202/141 |

*Primary Examiner*—Barry S. Richman
*Attorney, Agent, or Firm*—Thomas L. Sivak; Oscar Brumback

[57] ABSTRACT

In a coke oven battery, a part of the waste heat gas is recycled to mix with and dilute the rich fuel heating gas, using conduits and valve mechanisms outside the brickwork constituting the battery proper.

4 Claims, 3 Drawing Figures

APPARATUS FOR PROVIDING WASTE GAS RECIRCULATION IN COKE OVEN BATTERIES

BACKGROUND OF THE INVENTION

The present-day heating systems used in coke oven batteries in this country fall into two general classes: The gun-flue type and the underjet type. This invention relates more particularly to improvement in the apparatus for recirculating waste gases in a gun-flue type of coke oven battery.

The present invention is especially designed for high ovens in which the distribution of the heat of rich fuel gas to the tops of the flues is difficult when fuel gas of high calorific value is used. When coke oven gas that is given off by the carbonization of coal in the coke oven chambers, and that has a high calorific value, is used, it burns with a short, intense (hot) flame and it deposits free carbon both in the gun flues and in the high and low burners unless it is diluted.

Heretofore, in some instances, it has been the practice to provide ambient air from outside the battery for diluting and decarbonizing the gun flues and burners. In other instances it has been the practice to recirculate waste gases of combustion from within the battery, and more particularly, waste gases from the downflow vertical heating flues of the battery.

The effectiveness and the advantages of recirculating waste gas and mixing it with fuel gas in the burning walls of a coke oven battery has been well established and proven in underjet batteries. It has been established that such waste gas mixing with fuel gas provides improved vertical heat distribution in the burning flues.

However, in gun flue batteries the gas distribution header, or "gun flue", is located above the regenerator wall and just below the heating wall. This construction makes it nearly impossible to provide the desired jet aspirating action in the same manner as that provided in an underjet battery.

U.S. Pat. No. 3,192,134 describes and teaches the use of a recirculating duct at each end of the opposite ends of each pair of flues in each heating wall, at the level of the tops of the regenerators. Each recirculating duct connects the gun flue for one of the two sets of vertical combustion flues in each heating wall with the top of the regenerator that is communicably connected for the inflow of air and for the outflow of waste gas to the other set of combustion flues in the same heating wall.

The present invention is an improvement over the invention described in U.S. Pat. No. 3,192,134, as will become apparent to those skilled in the art from a reading of the following detailed description of a preferred embodiment of the present invention, shown in the drawings.

SUMMARY OF THE INVENTION

In a coke oven battery having a source of waste heat gas and heating walls and flues therein, with conduit means carrying a gaseous fuel into the flues of each heating wall for burning and generating heat therein, the combination with said conduit means of the improvement comprising a first conduit carrying fuel gas into the conduit means with a second conduit communicating with the first conduit; both the first and second conduits being disposed outside of the coke oven battery. A third conduit communicates with the source of waste heat gas, and means communicating with the third conduit selectively diverts the flow of waste heat gas from one second conduit of one heating wall to the second conduit of another heating wall.

For a further understanding of the invention and for features and advantages thereof, reference may be made to the following description and the drawings which illustrate a preferred embodiment of equipment in accordance with the invention.

DETAILED DESCRIPTION

For purposes of illustration only, and not by way of limitation, the present invention is shown and described herein as being applicable to the well-known Koppers-Becker coke oven battery. Those skilled in the art will recognize, however, that the present invention can be applied to other types of coke oven batteries.

Figure 1:
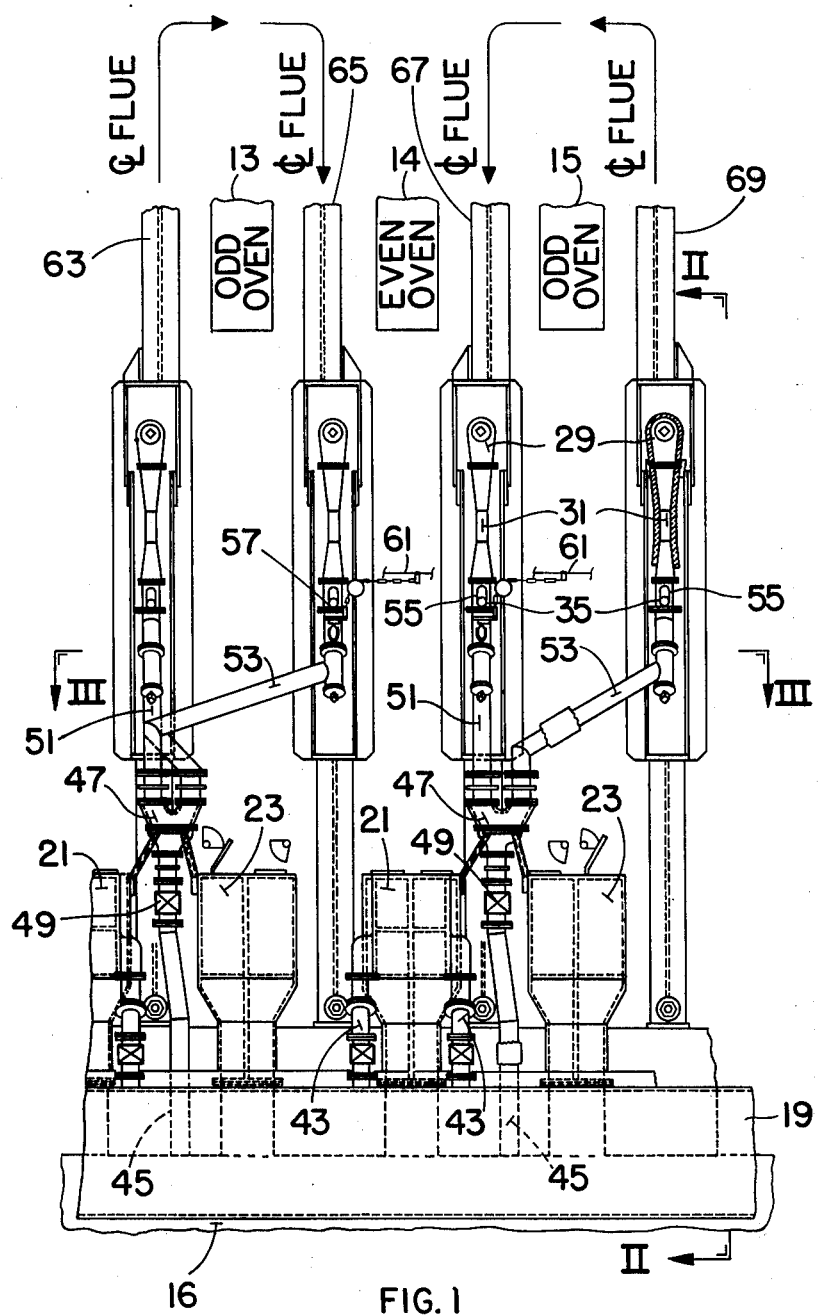
FIG. 1 is a partial front elevational view of the coke side of a coke oven battery of the gun-flue type.
Figure 2:
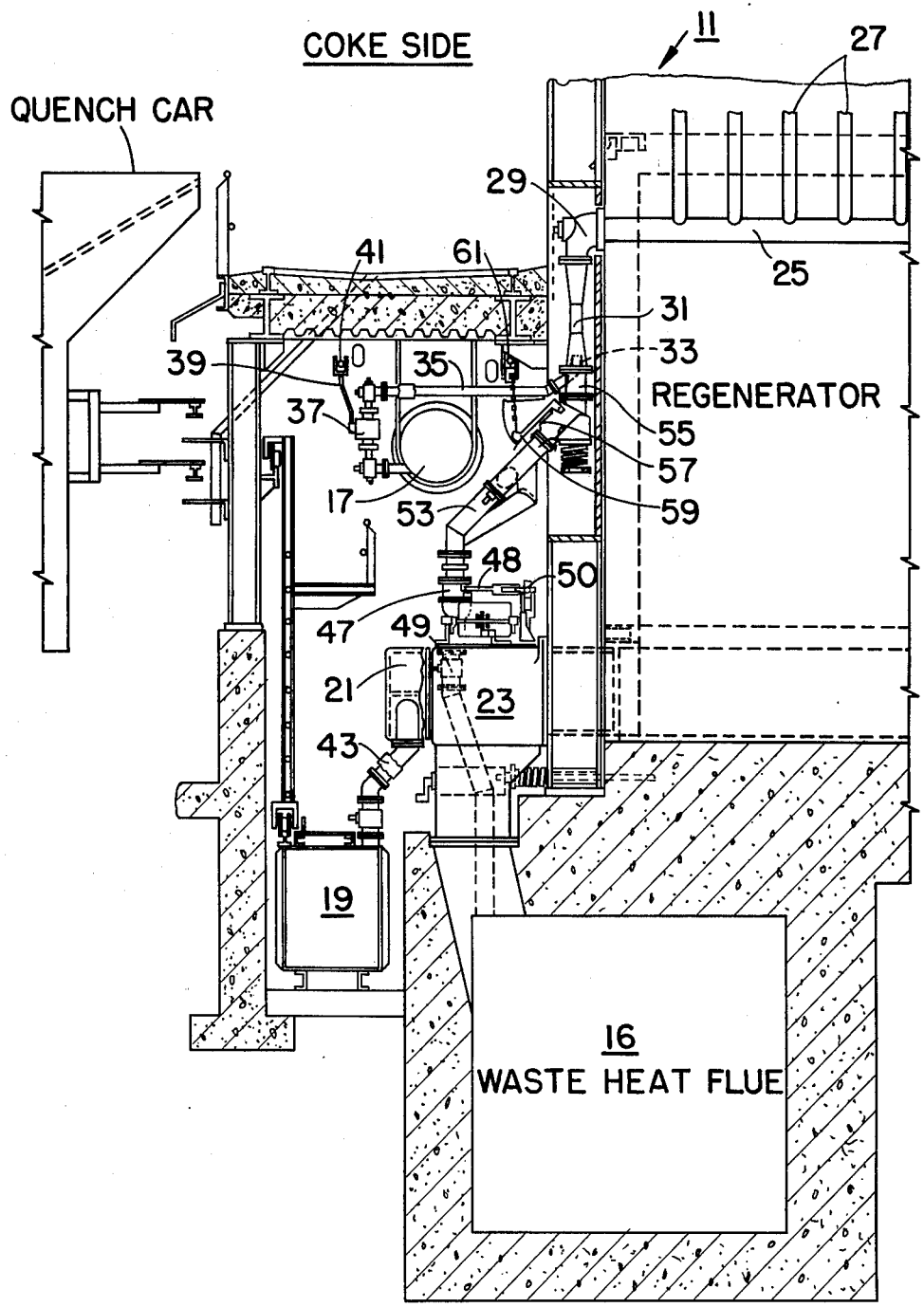
FIG. 2 is a view along line II—II of FIG. 1.

Referring to FIGS. 1 and 2, a portion of the coke side of a coke oven battery 11 of the gun-flue type is shown, and two odd-numbered oven chambers 13, 15 and one even-numbered oven chamber 14 are suggested.

As shown in FIG. 2, the coke oven battery 11 also includes: on the coke side, a waste heat flue, so designated by legend in FIG. 2 and by numeral 16 in FIG. 1; a fuel gas main 17; a blast furnace gas conduit 19; waste heat and blast furnace gas boxes 21; and waste heat and air boxes 23.

As shown in FIG. 2, the coke oven battery 11 is provided with a gas gun flue 25 for each heating wall. Rising from the gas gun flue 25 are conduits 27 that carry the fuel mixture from the gun flue 25 to the several heating flues in the respective heating wall.

The gas gun flue 25 is connected to a gas gun 29 which is also connected to a venturi section 31. The venturi section 31 is provided with a fuel jet nozzle 33 that is disposed about where shown in the lower end portion of the venturi section 31, and the fuel jet nozzle 33 is a terminal end of conduit 35 communicating with the fuel gas main 17. Fuel gas then flows from the gas main 17 through a reversing valve 37 into the fuel jet nozzle 33 and thence into the venturi section 31. The reversing valve 37 is provided with an operating arm 39 that is secured in a conventional manner to a reversing rod 41 for actuating simultaneously the reversing valve associated with heating flue wall 63.

Figure 3:
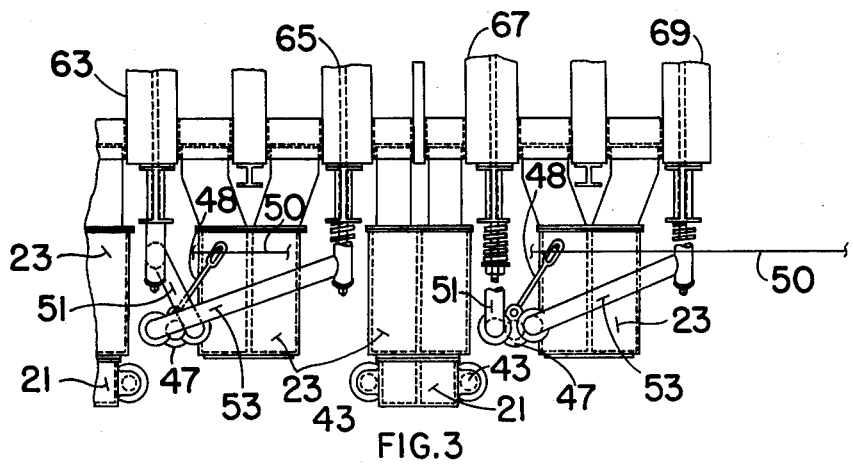
FIG. 3 is a view along line III—III of FIG. 1.

As shown in FIGS. 1-3, a pair of conduits 43 carry blast furnace gas from the blast furnace gas main 19 into the waste heat and blast furnace gas boxes 21.

As shown in FIGS. 1-3 also, a conduit 45 carries waste heat gas from the waste heat flue 16 to a waste heat reversing valve 47; the waste heat gas passing through a waste heat shutoff valve 49. Each reversing valve 47 is provided with an actuating arm 48 that is suitably connected to an actuating rod 50, to which a plurality of such actuating rods are connected and by means of which the several reversing valves act simultaneously.

From the waste heat reversing valve 47, two conduits 51, 53 lead respectively to the flue wall 67 between ovens 14 and 15, and to the flue 69 between oven 15 and the next adjacent oven (not shown) on the right-hand side in FIG. 1. Each conduit 51 and 53 connects to a spool piece 55 that is flange connected as shown to the bottom flange of the venturi section 31.

The conduits 51, 53 are each provided with carbon caps 57 which would be opened after a slight delay by the reversing machine (not shown) when the respective heating walls are in the "off" stage. The carbon caps 57 are each provided with an actuating lever 59 connected to a length of chain passing over a sheave and connected to an actuating rod 61.

In a coke oven battery employing the well-known Koppers-Becker heating system, all of the flues in a pair of heating walls are burning or "on" flues, and all of the flues in a companion pair of heating walls are downdraft or "off" flues.

In FIG. 1, coke oven fuel gas is available to flues in each one of the heating walls 63, 65, 67, 69. From the fuel gas main 17, the fuel gas flows through the conduit 35 and the reversing valve 37. The fuel gas then emerges from the fuel jet nozzle 33 and flows into the venturi section 31; then into the gas gun 29, and finally into the gun flue 25. From the gun flue 25, the fuel gas is available to flow into the several riser conduits 27 of the several "on" flues in the heating wall 63. A similar gun flue and risers are associated with each heating wall of the battery. Heating walls 65, 67 are off.

Generally, in the Koppers-Becker heating system on one reverse, the flues in the 1, 4, 5 heating walls are burning or "on" flues, and in the intermediary heating walls, 2, 3, the flues are downdraft or "off" flues. In the embodiment of the invention shown in FIG. 1, the flues in heating walls 63, 69 are burning or "on" flues, while the flues in heating walls 65, 67 are downdraft or "off" flues.

In the heating system indicated in the drawings and as described herein, the venturi section 31 and the fuel jet nozzle 33 provide aspiration by drawing hot waste gases from the waste heat fuel 16 through the conduit 45, reversing valve 47, insulated conduit 53, and spool piece 55 into the venturi section 31 so as to flow around the fuel gas jet nozzle 33. The waste gas is prevented from flowing into conduit 51 because the waste heat reversing valve 47 is so positioned that the waste heat gases can flow only into conduit 53. The waste heat gases mix with the rich fuel gas in the lower portion of the venturi section and provide the desired dilution of the fuel gas. Then, the mixture of fuel gas and the hot air from the regenerative system flow into the gas gun 29 and thence into the gun flue 25. The diluted gas mixture burns in the heating flues with the desired "long flame".

The products of combustion are withdrawn from the "on" flues into the downdraft or "off" flues 65, 67, and then to a regenerator and into the waste heat flue 16. As for the flues in the "off" heating walls, the waste heat reversing valves 47, and the fuel gas reversing valves 37 are in the off position, and the waste heat shutoff valves 49 are open.

The carbon caps 57, as mentioned previously, would be opened after a slight delay by the reversing machine when the respective heating walls 65, 67 are off. Then decarbonizing ambient air flows through the venturi 31 and the gun flue 25 to the risers 27, and thence through the fuel gas nozzles (not shown) and the "off" heating flues to remove any carbon that may have formed on the nozzles when the now "off" nozzles were on the "on" cycle. The recirculated waste heat gas retards the formation of carbon in the gas nozzles during the burning or "on" cycle, so that the use of the carbon caps may or may not be required.

As is customary in coke oven operating procedure, at preset time intervals of about 20 to 30 minutes, the flows described herein are reversed. Then heating walls 65, 67 become the burning or "on" heating walls and the heating walls 63, 69 become the "off" heating walls. This reversal is accomplished in a known manner by actuating rods connected to valve operating levers.

If at some time the entire coke oven battery is changed over from rich gas to lean gas underfiring, all of the waste heat shutoff valves 49 would be closed, thereby preventing any flow of lean gas from an "on" flue or heating wall into the waste heat flue through the waste heat gas recirculation conduits. Waste heat gas dilution is not required when the coke oven battery is underfired with lean or blast furnace gas.

In other embodiments of the invention, the waste heat gas could be aspirated from the waste heat boxes, or from the "off" regenerators.

It is recognized that the recirculation of hot waste gases for the dilution effect has many advantages over adding cool waste gases or other inert gases to the fuel or air supply. Among the many important features and advantages of the present invention, the following are particularly significant:

That no corrosion problems exist when the waste gas is maintained above the dew point;

That elaborate gas cleaning systems are not required;

That use of other inert gases such as nitrogen is not required at considerable saving in cost;

That heat is conserved by recirculating the hot waste heat gases; and

That more uniform vertical heating of the walls is achieved by a long flame when waste gas is recirculated and minimum carbon deposition results.

Although the invention has been described herein with a certain degree of particularity it is understood that the present disclosure has been made only as an example and that the scope of the invention is defined by what is hereinafter claimed.

What is claimed is:

1. In a gun flue type coke oven battery having a plurality of heating chambers, heating walls having flues therein, a plurality of internal fuel conduit means adapted to carry a gaseous fuel into the flues of each heating wall for burning therein and means for conducting the waste gases of combustion to a regenerator for regenerating said gases by reclaiming heat therefrom, the improvement comprising:

a. a plurality of first conduit means carrying fuel gas into a preselected internal conduit means for the flues for said heating walls, said first conduit means being disposed outside of said battery, said first conduit means including control means for selectively diverting the fuel gas to a selected first conduit means, b. a plurality of second conduit means adapted to carry said regenerated waste gas into said first conduit means, said second conduit means being disposed outside of said battery, c. a third conduit means communicating with a reservoir means disposed outside said battery for receiving said regenerated gas from said regenerating means and with said second conduit means, said third conduit means including control means for selectively diverting the flow of regenerated gas to a preselected second conduit means; and d. means for aspirating said regenerated gas with said fuel gas.

2. The invention of claim 1 including:
a. stop valve means in said third conduit means for regulating and controlling the flow of waste heat gas therein.

3. The invention of claim 1 wherein:
a. said first conduit means includes two portions with one portion including a venturi section and a second portion carrying a nozzle that is therein disposed in a direction toward the throat portion of said venturi section; and
b. said second conduit means communicates with said venturi section in such a way that said waste gas flows around said nozzle confluently with fuel gas flowing from said nozzle.

4. The invention of claim 1 including:
a. means associated with said second conduit means for introducing ambient air into said second conduit means.

* * * * *